US008732239B2

(12) United States Patent
Lei et al.

(10) Patent No.: US 8,732,239 B2
(45) Date of Patent: May 20, 2014

(54) SYSTEM AND METHOD FOR PROVIDING MULTIMEDIA WIRELESS MESSAGES ACROSS A BROAD RANGE AND DIVERSITY OF NETWORKS AND USER TERMINAL DISPLAY EQUIPMENT (75) Inventors: Zhibin Lei, Edison, NJ (US); Irene Yuen Han Fan, Kowloon (HK); Yiu Wing Wat, Kowloon (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 2966 days.

(21) Appl. No.: 10/677,418

(22) Filed: Oct. 2, 2003

(65) Prior Publication Data

US 2005/0075093 A1 Apr. 7, 2005

(51) Int. Cl.
*G06F 15/16* (2006.01)
(52) U.S. Cl.
USPC .......................................... 709/204
(58) Field of Classification Search
USPC .......................................... 709/204
See application file for complete search history.

(56) References Cited

U.S. PATENT DOCUMENTS

| | | | | |
|---|---|---|---|---|
| 2,004 | A * | 3/1841 | Hunter et al. | 440/90 |
| 5,742,905 | A * | 4/1998 | Pepe et al. | 455/461 |
| 5,751,791 | A * | 5/1998 | Chen et al. | 379/88.13 |
| 5,946,646 | A | 8/1999 | Schena et al. | |
| 5,953,507 | A * | 9/1999 | Cheung et al. | 709/250 |
| 6,067,529 | A * | 5/2000 | Ray et al. | 705/26 |
| 6,078,896 | A | 6/2000 | Kaehler et al. | |
| 6,119,101 | A | 9/2000 | Peckover | |
| 6,122,501 | A | 9/2000 | Gallant | |
| 6,157,946 | A | 12/2000 | Itakura et al. | |
| 6,167,441 | A * | 12/2000 | Himmel | 709/217 |
| 6,208,387 | B1 | 3/2001 | Magnusson et al. | |
| 6,324,519 | B1 | 11/2001 | Eldering | |
| 6,332,127 | B1 | 12/2001 | Bandera et al. | |
| 6,356,893 | B1 * | 3/2002 | Itakura et al. | 707/3 |
| 6,415,263 | B1 * | 7/2002 | Doss | 705/26 |
| 6,484,148 | B1 | 11/2002 | Boyd | |

(Continued)

FOREIGN PATENT DOCUMENTS

| | | |
|---|---|---|
| CN | 1350753 | 5/2002 |
| EP | 1271970 | 1/2003 |

OTHER PUBLICATIONS

RFC822—Standard for the Format of Arpa Internet Text Messages Dept. of Electrical Engineering, University of Delaware, Newark, DE 19711, Network: DCrocker @ UDel-Relay, Aug. 13, 1982, http://www.faqs.org/rfcs/rfc822.html.*

(Continued)

*Primary Examiner* — Tauqir Hussain
(74) *Attorney, Agent, or Firm* — Fulbright & Jaworski LLP (57) ABSTRACT

Disclosed are systems and methods which establish a referral gateway for facilitating multi-media content, or other rich content, exchange among users and user devices. Embodiments connect a WLAN, or any specific local area network, with a mobile cellular network for efficiently transmitting messages including rich content. In operation, a sending user does not need to download particular content to form a message, but instead sends a code to a referral gateway which compiles the message and arranges for delivery, such as over a fixed network, a cellular network, etcetera. Using such systems and methods neither the receiver nor the sender are limited by their respective network and/or user device capabilities.

8 Claims, 4 Drawing Sheets

(56) References Cited

U.S. PATENT DOCUMENTS

| | | | |
|---|---|---|---|
| 6,499,021 B1* | 12/2002 | Abu-Hakima | 706/10 |
| 6,506,046 B1 | 1/2003 | Luo | |
| 6,553,410 B2* | 4/2003 | Kikinis | 709/218 |
| 6,567,828 B2* | 5/2003 | Inohara et al. | 707/204 |
| 6,584,323 B1 | 6/2003 | Son | |
| 6,584,613 B1 | 6/2003 | Dunn et al. | |
| 6,701,378 B1* | 3/2004 | Gilhuly et al. | 709/249 |
| 6,763,226 B1* | 7/2004 | McZeal, Jr. | 455/90.2 |
| 6,785,680 B1* | 8/2004 | Cragun | 707/10 |
| 6,839,744 B1* | 1/2005 | Kloba et al. | 709/219 |
| 2001/0047426 A1* | 11/2001 | Hunter | 709/238 |
| 2002/0087704 A1* | 7/2002 | Chesnais et al. | 709/228 |
| 2002/0103935 A1* | 8/2002 | Fishman et al. | 709/246 |
| 2002/0120684 A1* | 8/2002 | Christfort et al. | 709/203 |
| 2002/0145984 A1* | 10/2002 | Babu et al. | 370/312 |
| 2002/0198009 A1 | 12/2002 | Komsi et al. | |
| 2003/0045311 A1* | 3/2003 | Larikka et al. | 455/466 |
| 2003/0046222 A1* | 3/2003 | Bard et al. | 705/38 |
| 2003/0085275 A1* | 5/2003 | Barkan | 235/383 |
| 2003/0193967 A1* | 10/2003 | Fenton et al. | 370/490 |
| 2004/0010602 A1* | 1/2004 | Van Vleck et al. | 709/229 |
| 2004/0063449 A1* | 4/2004 | Fostick | 455/517 |
| 2004/0067769 A1* | 4/2004 | King et al. | 455/556.1 |
| 2004/0098625 A1* | 5/2004 | Lagadec et al. | 713/201 |
| 2004/0117255 A1* | 6/2004 | Nemirofsky et al. | 705/14 |
| 2004/0243719 A1* | 12/2004 | Roselinsky | 709/245 |
| 2004/0249768 A1* | 12/2004 | Kontio et al. | 705/65 |
| 2004/0258063 A1* | 12/2004 | Raith et al. | 370/389 |
| 2005/0020250 A1* | 1/2005 | Chaddha et al. | 455/414.1 |
| 2005/0038892 A1* | 2/2005 | Huang et al. | 709/227 |
| 2005/0060363 A1* | 3/2005 | Jang et al. | 709/200 |
| 2005/0256937 A1* | 11/2005 | Lewis | 709/217 |
| 2005/0259604 A1* | 11/2005 | Salmi | 370/310 |
| 2007/0047523 A1* | 3/2007 | Jiang | 370/352 |
| 2007/0064887 A1* | 3/2007 | Bjorklund et al. | 379/88.17 |
| 2007/0076857 A1* | 4/2007 | Chava et al. | 379/88.17 |
| 2007/0099703 A1* | 5/2007 | Terebilo | 463/42 |

OTHER PUBLICATIONS

Riordan, Teresa, "Patents; Combing the Web for data on consumers that will let companies aim aids most effectively", New York Times, Business/Financial Desk, Dec. 7, 1998, Obtained from, www.nytimes.com/librabry/tech/98/12biztech/articles/07/patents.html, 1 page.

Chetham, Andrew, "Endure an Ad, Make a Free Call", Wireless Week, Nov. 15, 1999, 2 pages.

Pastore, Michael, "Is That an Ad in Your Pocket?", Advertising on mobile devices could be e-marketing's next big thing. Obtained from, http://adres.internet.com/feature/article/0,1401,8961_299991,00.html. 4 pages.

"Otis to Join Forces With IBM and Next Generation Network to Provide Internet-Based Information in Elevators", Webpage Article, Dec. 7, 1999, Obtained from, http://utc.com/press/realeses/1999-12-07.htm, 2 pages.

Blair, Jayson, "Turning Pixels Into Panache" New York Times, Metropolitan Desk, Feb. 17, 2000, 3 pages.

"Faster fast food: Drive-through without stopping" Jan. 28, 2000, obtained from, www.cnn.com/2000/FOOD/news/01/28/fast.food.reut. 1 page.

"World Theatre, Inc. Teams Up with IBM to Revolutionize Out of Home Advertising and Press Forward to Create a New On-Demand Marketplace". Dec. 31, 1999, webpage obtained from, http://www.businesswire.com. 1 page.

International Search Report issued for PCT/CN2004/001126, dated Jan. 6, 2005.

\* cited by examiner

SYSTEM AND METHOD FOR PROVIDING
MULTIMEDIA WIRELESS MESSAGES
ACROSS A BROAD RANGE AND DIVERSITY
OF NETWORKS AND USER TERMINAL
DISPLAY EQUIPMENT

TECHNICAL FIELD

This invention relates to mobile and wireless networks and more particularly to systems and methods for providing multimedia messaging between network nodes.

BACKGROUND OF THE INVENTION

Users of cellular telephone networks often desire to send documents, including video clips, music and the like, to other telephone users and/or to users not on a cellular telephone, such as users who are connected via the Internet. Multimedia messaging service (MMS) is designed for such users and takes advantage of the cellular network.

One problem with current MMS systems is that they require a sender to take physical custody of the message, i.e., store the message in the sender's communicating device. Since multi-media messages are typically large files which typically consume a relatively large amount of bandwidth in their transmission and which often take an appreciably long time to deliver, the aforementioned message custody requirement results in various disadvantages.

For example, the sender must have a method of first obtaining content. In some situations, the content can be delivered from a third person or entity, such as a broadcast or advertisement. However, in some situations the user will desire to create his or her own message, usually with video or other multi-media information content. Under existing systems this is difficult to achieve, and typically is accomplished by down loading content from a stored file, changing the content and/or adding content, and then re-transmitting the content as a message to the recipient. A user may be limited in the content which can be used to create a message due to user device storage limitations. Additionally, creation of a message may be difficult and time consuming, due to the requirement of acquiring all portions of the message locally.

Compounding the problem even further is the fact that many users wish to retransmit the message to one or more other users at a different telephones. Thus, this same large message must again be transmitted through the cellular network. Accordingly, even when a user does not desire to create a new message, but rather merely wishes to provide interesting content to a friend, the transmitting user must both obtain the message for storage in the sender's communicating device and transmit the message through the network to the friend, thus being faced with the time it takes to transmit the file through the network twice (or more depending upon the number of recipients). It can readily be appreciated that the present multi-media messaging service is not efficient with respect to bandwidth usage or time.

Another currently existing problem is that the cellular network serves primarily mobile users while the Internet or other data networks primarily serve users who are fixed in space, and thus the user devices and their capabilities are different as well as the situations in which the user devices may be available and utilized are different. Even wireless local area networks (WLANs) are typically fixed in location and serve high density areas (also referred to herein as hot spots), such as airports, coffee-shops, hotels, and the like, and cover only a relatively small geographical area. Data networks, such as the Internet and WLANs, and cellular networks function as substantially separate networks and are not very directly related or conveniently connected to each other. Although some interconnectivity has been provided in the past, the interface is typically very limited in its application and fails to take advantage of different resources available to the devices of each type of network.

BRIEF SUMMARY OF THE INVENTION

The present invention is directed to systems and methods which establish a referral gateway which provides an interface to efficiently and effectively communicate messages, such as messages having multi-media content. In operation according to a preferred embodiment, a sending user does not need to obtain possession of all, or even any portion, of content forming a message, but instead sends an abbreviated message to a referral gateway of the present invention, invoking the referral gateway to arranges for the delivery of a message including the proper content to a selected recipient or recipients. Using systems and methods of the present invention neither the receiver nor the sender are limited by their respective network bandwidth, by their user device capabilities, or even by their mobility.

According to one embodiment, the aforementioned abbreviated message may including an identifier or identifiers of desired content, e.g., codes uniquely identifying files, video, audio, advertisements, and/or other desired content, and an identifier or identifiers of intended recipients, e.g., telephone numbers, names, handles (such as screen names), electronic addresses (such as electronic mail addresses), and/or other information uniquely identifying recipients or recipient groups. The abbreviated message may additionally or alternatively include content, such as a brief statement commenting on additional content forming the message which is uniquely identified therein.

Content to be sent in messages by referral gateways of embodiments of the invention resides in a database or databases accessible by the referral gateway. Such databases may be associated with third parties or otherwise not directly owned or controlled by a referral gateway. However, according to a preferred embodiment, such databases are adapted to interface with referral gateways of the present invention to facilitate simplified identification of desired content by message senders. For example, a content database may be coupled to a referral gateway of the present invention wherein a user (e.g., message sender) and/or a third party places content and assigns or is assigned a code to uniquely identify the content. Thereafter, the aforementioned abbreviated messages may be utilized to invoke transmission of a desired message to an intended recipient.

Referral gateways of embodiments of the present invention provide interfacing between various networks, such as data networks (e.g., a WLAN, a local area network (LAN), a metropolitan area network (MAN), a wide area network (WAN), the Internet, and/or the like), cellular telephone networks (e.g., personal communication services (PCS), global system for mobile (GSM), IS-95, CDMA 2000, and/or the like), satellite networks, broadcast networks (e.g., TV, CATV, and/or the like), etcetera. Accordingly, a user is enabled to transmit a message from various devices, such as cellular telephones, computer systems, personal digital assistants (PDAs), advertising kiosks, point of sale systems (POS), Internet appliances, consumer electronic devices (e.g., home media center, personal video/information recorder, and the like), and other convergent devices (e.g., consumer and communications, information and computer, and the like), etcetera, to any one or more such devices. Accordingly, embodiments of the present invention provide configurations in which mobile commerce (m-commerce) can flourish, as well as in which electronic commerce (e-commerce) may realize additional potential, by providing networks which work together more seamlessly than they presently do and by facilitating the exchange of large data files with little disruption to either network in a timely and convenient manner.

Moreover, embodiments of the invention operate to provide content as a function of particular networks and/or user devices being utilized by users. For example, a user may transmit a message using a cellular telephone to a user receiving the message by computer. Referral gateways of the present invention may recognize the enhanced capability of the recipient computer, such as by the particular network the message is being directed to, by the address of the intended recipient, etcetera, and thus provide a more robust version of the content that may have been available to the sender of the message. Such more robust versions of content may comprise additional content, improved image resolution, improved audio sampling, etcetera.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 3:
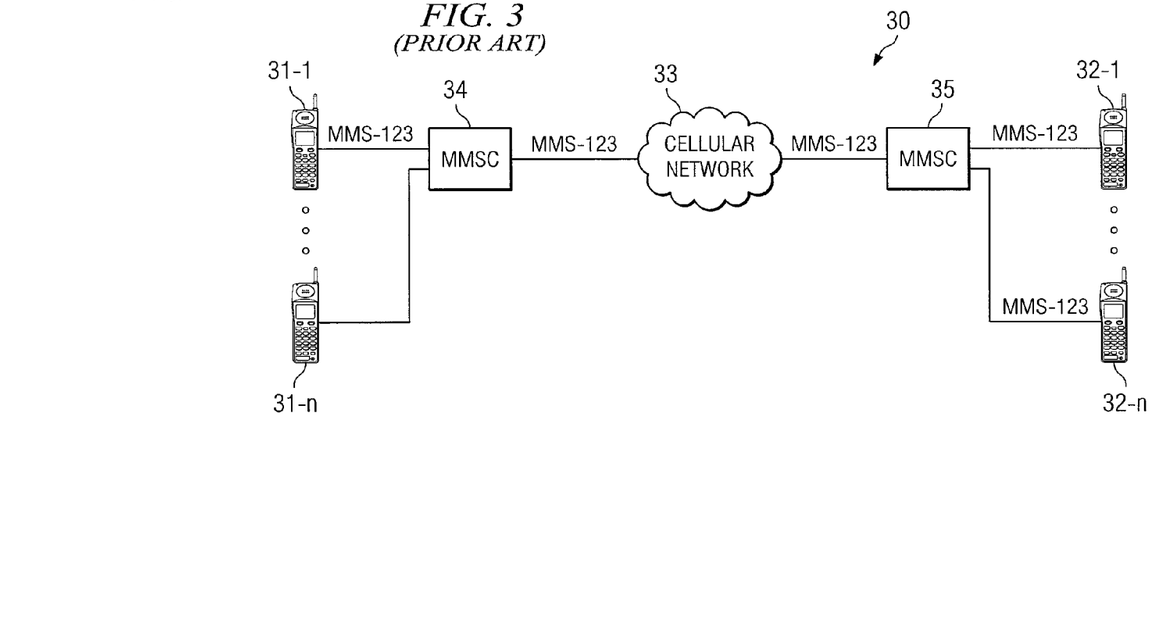
FIG. 3 is a block diagram of a typical prior art system.

Before beginning a description of the concepts of the present invention, it is helpful to review a system of the prior art. FIG. 3 shows system 30 in which a plurality of user devices (here cellular telephones 31-1 through 31-n and 32-1 through 32-n) are provided multi-media message service (MMS) messaging via cellular network 33 using one or more MMS centers (here MMSCs 34 and 35). MMSCs provide gateway interfacing with respect to the MMS capable user devices and cellular network 33.

In operation, a user at user device 31-1 may wish to transmit a message (MMS-123) from user device 31-1 to user device 32-1. User device 31-1 must first download (or otherwise locally obtain) the entire content of message MMS-123. Thereafter, user device 31-1 uploads message MMS-123 to MMSC 34 which then sends message MMS-123 through cellular network 33 and via MMSC 35 to user device 32-1. Message MMS-123 could be, and usually is, very large and could take an appreciable amount of time to be transmitted between the various network aspects mentioned above.

Disadvantages in the prior art configuration of FIG. 3 are aggravated in a situation in which a user wishes to have the message delivered to multiple users. For example, assume that the user of user device 31-1 desires to send message MMS-123 to several users, e.g., a user at each of user devices 32-1 and 32-n. In this situation, user device 31-1 will transmit the message to MMSC 34 for each intended recipient. In turn, each of the network nodes in a link between users, e.g., MMSC 34 and MMSC 35, will transmit the message for each associated recipient. Such a scenario will tax the cellular network because it requires the entire message to be sent from telephone to telephone. Further compounding the problem, one or more of the recipients may wish to further send the message.

Figure 1:
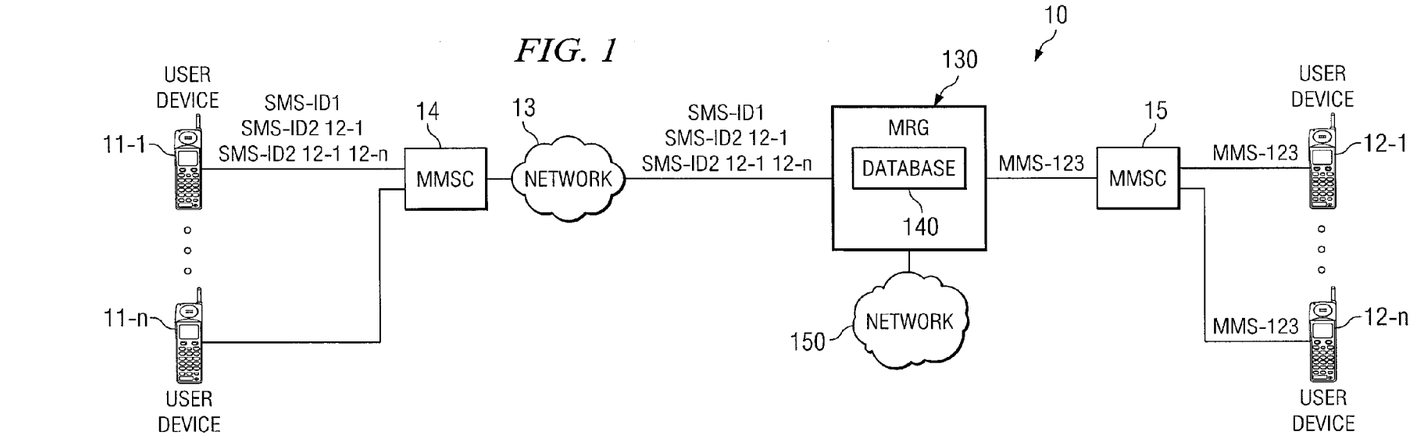
FIG. 1 shows a block diagram of one embodiment of the invention.

FIG. 1 shows system 10 configured according to an embodiment of the present invention. A network structure similar to that of FIG. 3 is employed in the embodiment illustrated in FIG. 1, however Media Referral Gateway (MRG) 130 providing operation according to the present invention is inserted. In the illustrated embodiment, user devices 11-1 through 11-n and 12-1 and 12-n are shown as cellular telephones, however there is no limitation according to the present invention that cellular telephones be utilized as user devices. Accordingly, embodiments of the present invention may utilize cellular telephones, personal digital assistants (PDAs), computer systems, pagers, point of sale (POS) terminals, processor based kiosks, Internet appliances, and/or the like in any combination desired. In an embodiment in which user devices 11-1 through 11-n and 12-1 through 12-n are cellular telephones, MMSCs 14 and 15 may provide functionality as described with respect to MMSCs 34 and 35 above. Similarly, network 13 may comprise a cellular network similar to that of cellular network 32 discussed above. However, embodiments of the present invention may provide functionality at either or both of MMSCs 14 and 15 adapted to facilitate interfacing of particular user devices with network 13 (e.g., storing capability information of associated users, such as transmission rate support, battery life, display characteristics, etcetera) and/or omit one or more of MMSCs 14 and 15, as deemed desirable. Additionally, according to embodiments of the present invention network 13 may comprise networks in addition to or in the alternative to cellular networks, such as a WLAN, a LAN, a MAN, a WAN, the Internet, and/or the like.

MRG 130 may be disposed within network 12 according to embodiments of the present invention. However, preferred embodiments of the present invention dispose MRG 130 as an edge device of a network, such as network 13, in order to facilitate deployment of a messaging system of the present invention with little or no modification to legacy infrastructure. It should be appreciated there could be, and most likely will be, a plurality of MRGs utilized in a deployment, such as to distribute the MRGs throughout a service area. Such MRGs could be stand-alone devices or they could be linked, such as through network 13 or a separate network.

MRG 130 according to a preferred embodiment contains, or is in communication with, at least one database, shown here as database 140. The database can store content and/or messages for distribution from user devices to user devices, such as cellular telephones of a cellular network of network 13. Such content and messages may additionally or alternatively be provided to user devices of networks other than a cellular network, such as user devices coupled to network 150 (e.g., a WLAN, a LAN, a MAN, a WAN, the Internet, and/or the like). Accordingly, content stored in database 140 preferably includes a plurality of versions (MRG 140 may additionally or alternatively derive different versions of content as needed from stored content), each version having attributes suitable for use with respect to particular networks and/or user devices. For example, various versions of particular content may provide more detail or more definition, such as with respect to video or audio content. Such an embodiment allows some users to receive a very condensed (perhaps compressed) version of message content while other users receive more data rich versions of the same or related messages. A particular version of content to be provided to a user may be selected to optimize bandwidth utilization, to optimize transmission times, to optimize use of user device resources, may be selected by a sender or recipient, may be selected by user preferences, and/or the like.

For example, assume an advertiser has a very data rich video (perhaps even having optional video clips associated therewith) that the advertiser wishes to deliver to potential customers. The advertiser could place the data rich version in database 140 and could also place therein sub-clips of the video. The data rich version of the video and/or the sub-clips thereof may be provided a unique identification code, such as ID1, ID2, etcetera. A unique identification code may be provided for a family of content, e.g., versions of content or content and sub-clips thereof, and/or may be provided for different selected portions of content, e.g., versions of content or content and sub-clips thereof. Content identification codes utilized according to embodiments of the present invention may include information other than that uniquely identifying content or families of content. For example, routing information useful for identifying a particular MRG of a plurality of MRGs content is stored upon may be included in (or provided with) content identification codes.

Where a unique identifier is utilized with respect to a family of content, MRG 130 may operate to track content provided to a user to thereby provide an appropriate additional portion or version of content when a request using an identification code associated with a family of content is used. Similarly, when a user desires to forward content to another user using a identification code associated with a family of content, MRG 130 may operate to select an appropriate portion or version of content to provide to the recipient user. Of course, such MRG 130 functionality may be utilized even where identification codes are provided with respect to a family of content, such as to recognize an identification code associated with a version of content viewed by a particular user being forwarded to another user having a user device with enhanced capability to select an appropriate portion or version of content to provide to the recipient user.

After storing content in database 140, the advertiser may direct particular content, e.g., one of the aforementioned sub-clips, to one or more users, e.g., a user associated with user device 11-1, such as may be identified by an advertising opt-in list or a bulk mailing list. The user may view the sub-clip on an associated user device (in this example user device 11-1). The user and/or the associated user device may be provided the aforementioned unique identification code, such as a code identifying the sub-clip, other related sub-clips, and/or the associated data rich version of the video. For example, one or more unique identification codes may be presented unobtrusively during the presentation of the sub-clip and/or may be displayed before or after such a presentation. Additionally or alternatively, the user device may store such unique identification codes for use when a user selects a particular option, such as "play more," "forward content," etcetera. If the user desires to see more of the content, user device 11-1 could be controlled to send an abbreviated message, such as a short message service (SMS) message including a unique identification code, e.g., ID1, to MRG 130. Thereafter, MRG 130 may provide appropriate additional content to user device 11-1 for viewing by a user thereof.

The user of user device 11-1 may additionally or alternatively wish to send a message including content, whether the content already viewed by the user or content in the same family of content (e.g., the data rich video content associated with a viewed sub-clip), to another user, such as a user associated with user device 12-1. In such a situation, the user associated with user device 11-1 may send an abbreviated message, such as a SMS message including a unique identification code, e.g., ID2, identifying content to be included in a message to an intended recipient and including identification of the intended recipient (in the illustrated example, the intended recipient is associated with user device 12-1) to MRG 130. It should be appreciated that various forms of intended recipient identification may be used, such as a telephone number, an e-mail address, a screen name, etcetera. The message provided by user device 11-1 to MRG 130 (SMS-ID2 12-1 in the illustrated embodiment) instructs MRG 130 to send a message containing content identified by identification code ID2 (shown here as message MMS-123) to user 12-1.

It should be appreciated that, according to embodiments of the invention, the content identification code included in the abbreviated message need not specifically identify the particular content to be provided to the intended recipient. For example, the content identification code provided by a sending user may identify a version of the content viewed by that user. However, MRG 130 of embodiments of the present invention may operate to recognize that an intended recipient is associated with a network and/or user device suitable for use with another version of the content (e.g., a higher or lower resolution version of the content). Additionally or alternatively, MRG 130 may operate to select particular versions of content to be included in a message based upon considerations, such as current network utilization, historical transmission times, empirical data with respect to other user interaction, etcetera, to optimize operation.

The situation in which the user of user device 11-1 wishes to send a message to a plurality of other users may be addressed in a manner similar to that described above. For example, the user associated with user device 11-1 may send an abbreviated message, such as a SMS message including a unique identification code, e.g., ID2, identifying content to be included in a message and including identification of a plurality of intended recipients to MRG 130. The message provided by user device 11-1 to MRG 130 (SMS-ID2 12-1 12-n in the illustrated embodiment) instructs MRG 130 to send a message containing content identified by identification code ID2 (shown here as message MMS-123) to user device 12-1 and user device 12-n. Thus, a user need send only one message to have multiple messages delivered, and the sent message need not contain all of the data which will be contained in the delivered message.

It should be appreciated that in the foregoing examples, the full message travels only through the network from MRG 130 to the receiving user device or devices (e.g., user device 12-1 and user device 12-n), and not all the way from the sending user device (user device 11-1) to the receiving user devices. Moreover, in the case where ID2 identifies content other than that viewed by a user at user device 11-1, e.g., data rich video content associated with a sub-clip viewed by the sending user, the full message content need never be provided to user device 11-1.

Embodiments of the present invention operate to further optimize operation where a plurality of MRGs are deployed with respect to a network or networks. For example, although an abbreviated message may be transmitted to a MRG nearest by a particular sending user device, the aforementioned plurality of MRGs may interact to select the MRG nearest an intended recipient user device in the network to compile some or all of the content into the desired message for delivery to the intended recipient.

It should be appreciated that MRGs of the present invention provide not only for optimization of message transmission and content utilization, but also provide an infrastructure well suited for supporting new and heretofore unheard of content delivery paradigms. For example, as discussed above, using the exemplary abbreviated message scheme a particular user device need not ever have possession of content for transmission of a message including desired content to an intended recipient. Accordingly, advertisers are free to provide content delivery via multiple vehicles and yet facilitate sharing of such content among users. For example, advertisers may play content in the form of streaming video and/or audio in various venues, such as upon public transportation (e.g., buses, planes, trains, and elevators), at POS terminals (e.g., computerized cash registers and credit card terminals), on broadcast media (e.g., television and radio), at kiosks (including automatic teller machines and other special purpose terminals) deployed at public locations, etcetera, having one or more unique identification codes presented unobtrusively during the presentation and/or displayed before or after such a presentation. A user seeing the content may believe the content is of interest to a friend and, using an available user device such as the user's cellular telephone or PDA, may send an abbreviated message as described above to an MRG of the present invention to cause a message including desired content to be delivered to an intended recipient. Of course, a message including desired content may additionally or alternatively be sent to a device or devices associated with the sender, if desired. For example, the sending user may desire to see additional content or to receive a personal copy of the content and therefore send an abbreviated message to cause desired content to be included in a message to a selected user device associated with the sending user.

From the above, it should be appreciated that the extensive diversity of multimedia communication scenarios (in terms of bandwidth demands, delay tolerance, error sensitivity, etcetera) benefit from multimedia content being tailored towards the needs imposed by the user or device profiles prior to or during the provision of media services. However, a vast number of client profiles with different characteristics may act as a limiting factor on the seamless global delivery of the multimedia data.

Embodiments of the present invention, employing a MRG, such as MRG 130, facilitates the personalization of the multimedia services delivery. Accordingly, preferred embodiment MRGs provide adaptation of content to the limitations of the client terminals and the transmission channel conditions. A challenge for such adaptation functionality is dictated by the bandwidth requirements and device capabilities of the subscribers. In a simplest form, MRGs of the present invention may send a code (string of text) which can be processed at any platform. In such an embodiment, the text code may contain the pointer for the proper location of the multimedia (video and/or audio data). In a more complex form, MRGs of the present invention may comprise an imbedded transcoder, which transforms the multimedia data among multiple forms, such as between videos of different encoding parameters, images of different sizes, music clips of multi-tones to uni-tone, between multimedia data of different modalities (e.g., between a video and its transcript of description), and/or the like. For example, an advertisement video may be delivered to a legacy phone (without image or audio support) by showing the corresponding transcript of the original commercial video clip, or alternatively, the text string containing an address (the actual storage of the video data) and instruct the user to view at a later time or with a more powerful end-user terminal. Thus, the advertisement can be more effective and reach more recipients.

Figure 2A:
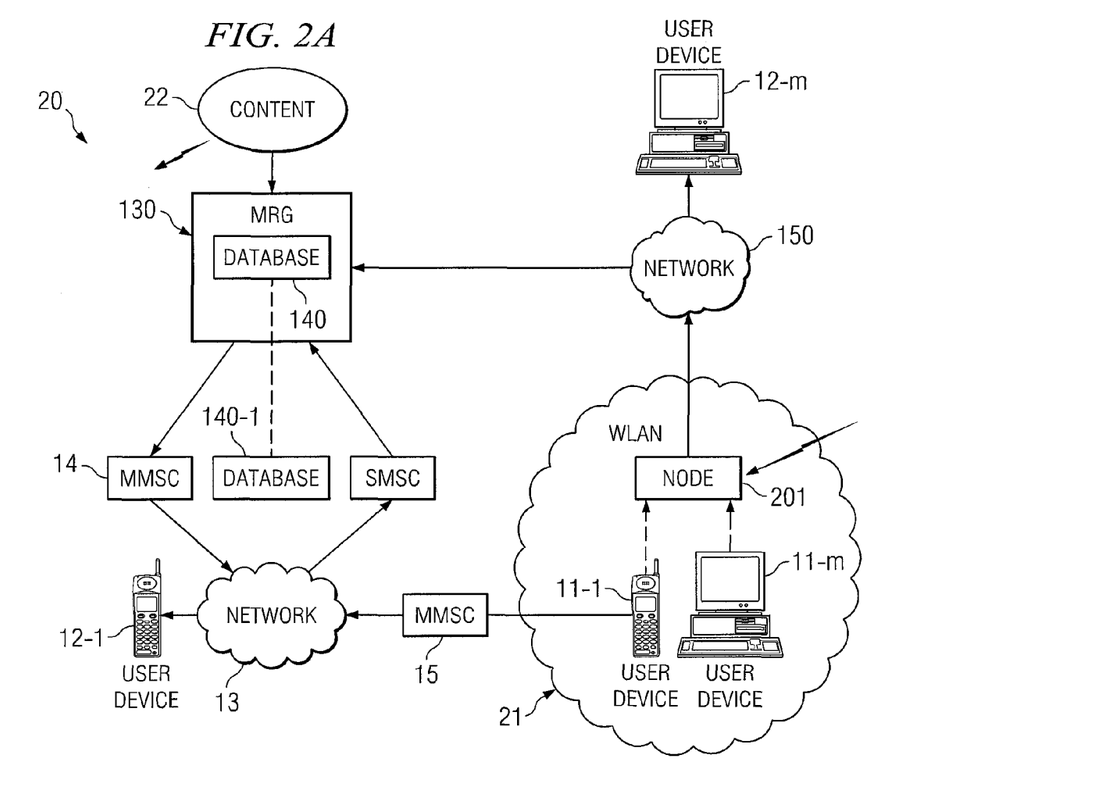
FIGS. 2A and 2B show exemplary deployments of embodiments of the present invention.

FIG. 2A shows system 20 configured according to an embodiment of the present invention as may utilized in facilitating various of the above described scenarios for sharing of such content among users. In the embodiment of system 20, a hotspot network, shown here as network 21, is utilized in the sharing of content. Network 21 of the illustrated embodiment may be disposed in any type of service area, such as a coffee shop, a retail store, a city bus, or even throughout a city. Network 21 could be a WLAN or a specific local network built by an operator. In one embodiment, network 21 is a mobile advertisement network having, as discussed, AD device(s) 201.

Within network 21 there is an advertisement device (AD), shown here as AD 201 such as may comprise a computerized cash register, a credit card terminal, a television, a radio, a display monitor, a kiosk, and/or the like, which shows messages which are preferably data rich. Using network 21, large data messages, often containing mixed media, such as music, video, etcetera, can be broadcast from one or more sources, such as content source 22, database 140, database 140-1, etcetera, for display at devices such as AD 201. Each of these messages can have many parts (e.g., content files) and each part could be further broken down so that different users could receive different amounts of data pertaining to a particular message. Thus, a user at a cell phone might first see a very condensed clip of video, while a user at a computer could see the full file. Since the full content is deposited in one or more MRGs according to embodiments of the present invention (e.g., database 140 and/or database 140-1), a user from a cell phone (seeing only a small portion of the data) can send the entire file to a user on a computer who could then download and view the entire amount of data.

AD 201 of the illustrated embodiment may additionally provide a network interface and/or one or more user device interfaces to facilitate operation as described herein. For example, a network interface may be utilized to receive content for display and/or to carry communications, such as the aforementioned abbreviated messages, useful according to the present invention. User device interfaces of an advertisement device may be useful for providing content identification codes to a user device, for providing content to a user device, and/or for receiving messages from user devices. However, there is no limitation according to the concepts of the present invention that an advertisement device provide a network interface and/or user device interface.

As an example of operation of system 20, a user associated with user device 11-1 may view a clip on AD 201 and decide to refer this product/message/video clip to a friend associated with user device 12-1. The sending user (the user associated with user device 11-1) has several options in referring the content to the friend. For example, the sending user may locate and download the desired content to user device 11-1, construct a MMS message, and send the MMS message to user device 12-1 via network 13 (where network comprises a cellular network such as cellular network 33), as discussed above with respect to FIG. 3. Alternatively, the sending user may send an abbreviated message, such as the aforementioned SMS messages, via user device 11-1, to MRG 130 so that MRG 130 can deliver the desired message to user 12-1 as discussed with respect to FIG. 1.

Note that the sending user may simply send the code associated with the desired content and the MRG compiles and sends the full message using a content database(e.g., databases 140 and/or 140-1). Alternatively, MRG 130 could simply send the code of the message to the receiving user at user device 12-1, and perhaps only a small portion of the message, so that the receiving user could then decide how much, if any, of the message to download and when he/she wants it downloaded.

It should be appreciated that user device 11-1 may transmit the abbreviated message to MRG 130 via network 13 as described above with respect to FIG. 1. Additionally or alternatively, user device 11-1 may transmit the abbreviated message to MRG 130 via network 150, such as by using a user device interface of AD 201 (e.g., an infrared interface, a bluetooth interface, a Wi-Fi interface, etcetera). Similarly, information useful according to the present invention, such as content identification codes, may be provided to the user device by AD 201 using the aforementioned user device interfaces.

Where the sending user views the original message at a device such as AD 201, that message might never be on the sending user's device (e.g., user device 11-1). Accordingly, if the sending user is provided an input means, such as where AD 201 comprises a computerized kiosk, the sending user may input information pertaining to the desired message and/or the identity(s) of the desired recipients to initiate transmission of a message. Under this scenario, the Internet, and particular WLAN hot spots along the Internet, could easily send data rich messages to a cellular telephone using a MRG (or a plurality of MRGs) of the present invention as a gateway into the cellular network.

Accordingly, it should further be appreciated that a sending user is not limited to use of a particular type of user device. Rather than using user device 11-1, such as may comprise a cellular telephone, a sending user may use user device 11-m, such as may comprise a computer system or PDA. Similarly, the present invention is not limited to delivery of messages to cellular telephones and, therefore, messages may be delivered to other user devices, such as a computer terminal shown as user device 12-m, using a MRG (or a plurality of MRGs) of the present invention. Preferred embodiment MRGs performs a plurality of functions, including transcoding, and distribution according to receiver's capability and desires.

Operation of embodiments of the present invention include functionality beyond the capability to transmit messages including desired content to user devices. For example, in one embodiment, the content (e.g., advertisement) shown on AD 201 could provide routing codes and/or content identification codes so that a user of user device 11-1 (or user device 11-m) could enter the routing and/or message codes and information be routed for placing an order or otherwise interacting with a third party. Accordingly, MRGs of the present invention can be linked to the Internet so that other web services can be completed, including e-commerce and m-commerce. For example, a user could see an advertisement on AD 201 and place an order from user device 11-1 which then would be processed by a third party using m-commerce and/or e-commerce paradigms (e.g., place an order on the fly, download goods on the fly, prompt for call-back or other interaction on the fly, etcetera). In such an application, advertisement will likely to pay for the MMS message download bandwidth since "referral through friends circle" will have a higher purchase rate. Likewise, where a user desires to use an application (such as a spreadsheet) but the user device the user has does not have the capability to store such a program nor does it have the computer power to use the application, a MRG of the present invention may be used to coordinate an application running at a server (perhaps the MRG) and can deliver the results to the limited use device as a message.

As shown in FIG. 2A, there are a plurality of substantially separate networks, including network 21 and network 13, which are bridged and integrated using a MRG of the present invention. Embodiments of the present invention separate the contents of the multimedia message from the input device so that simple input devices can control the movement, via the MRG, of messages which are data rich. Since the MRG can be connected to many networks it serves as a gateway to provide high bandwidth messages under control of relatively low bandwidth messages to or from one network from or to another network without regard to the type of terminal device being used.

Figure 2B:
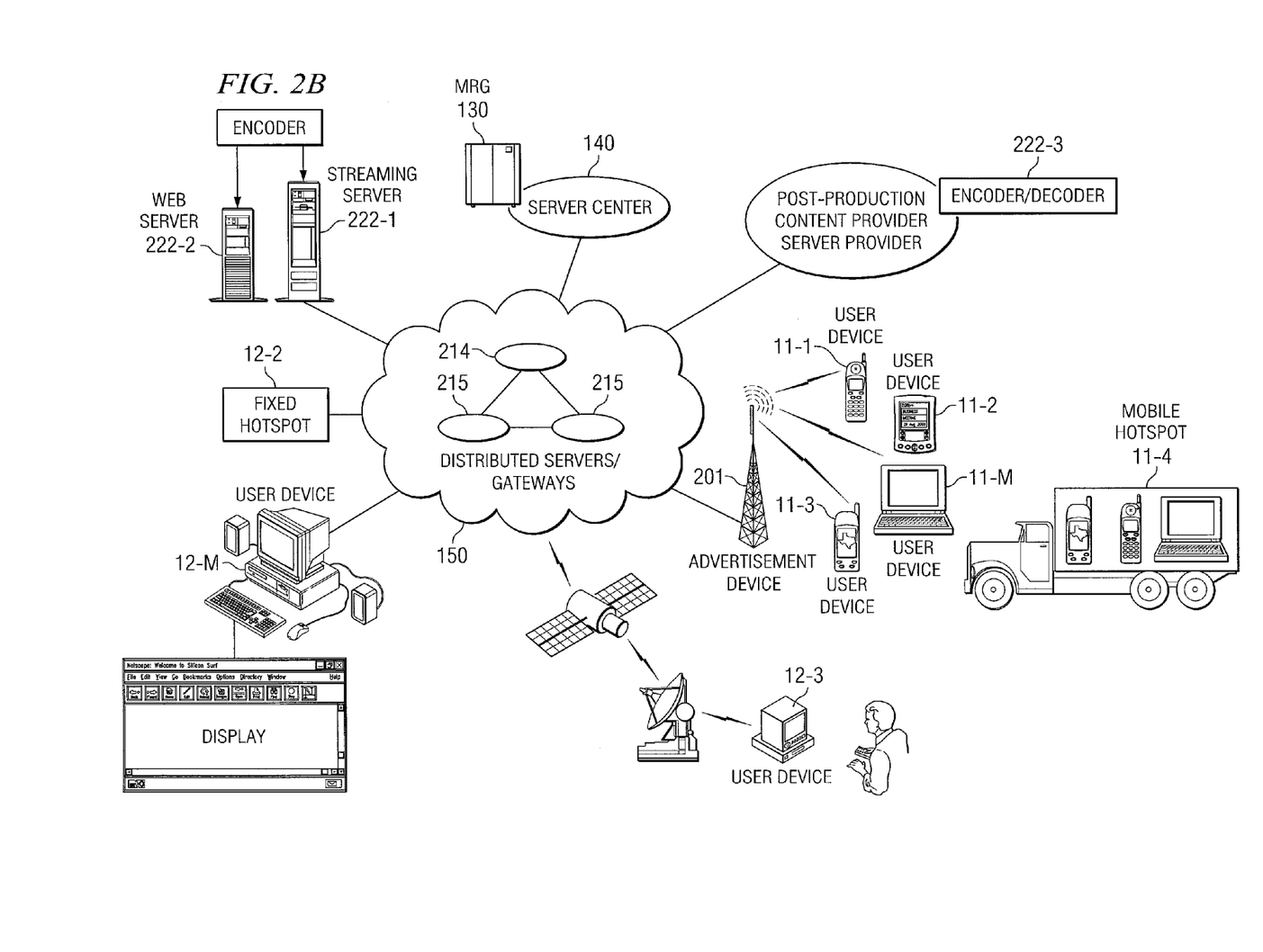

FIG. 2B shows a system overview of a context-dependant multimedia content delivery platform using an MRG of the present invention. In the configuration illustrated in FIG. 2B, centralized MRG 130 provides the necessary transformations of the original multimedia content for a successful delivery across a wide range of users and networks. Accordingly, a preferred embodiment of MRG 130 comprises or is coupled to a transcoder. Distributed servers/gateways 214 and 215 preferably provide information with respect to their associated user devices, such as transmission rate support, battery life, display characteristics etcetera. For example, user device information may be may be contained in several classes associated with popular user devices. The classes may formed in such a way that all the clients belonging to a class bear similar capabilities, such as equivalent bandwidth, display size or processing power requirements.

A variety of user devices are coupled to data network 150 which may utilize the capabilities of MRG 130. The user devices illustrated in FIG. 2B include those of fixed hotspot location 12-2 (e.g., public areas with limited resource but potential large group of temporary audiences), mobile hotspot location 11-4 (e.g., buses, trains, subways), and individual home/office environments (e.g., comprising user devices 11-1, 11-2, 11-3, 11-m, 12-3, and 12-m) with low, medium, or broadband network connections (either wire-line or wireless). For example, office Ethernet or WLAN connections and/or Home Entertainment Center environment with broadband connection (via Cable modem or xDSL) may be implemented in providing data connections useful according to the present invention.

Mobile/broadband multimedia service control is preferably provided with respect to the context-dependent multimedia content delivery platform of FIG. 2B, such as within or coupled to MRG 130. Such mobile/broadband multimedia service control preferably manages the control path and all the service related authentication, authorization, billing, service creation, and service delivery mechanism etcetera.

In operation according to one embodiment, MRG 130 and distributed gateway/servers 214 and 215 communicate and exchange information during call set-up. The media negotiation during the signaling is a unique feature to inform MRG 130 of the limitations and the requirements of its associated user devices. Thus MRG 130 can determine how to relay its input from a source or a media server (e.g., streaming servers 222-1, web servers 222-2, post-production content provider servers 222-3, etcetera) to individual subscribers by accomplishing a customization process, such as transcoding or adaptation, to the multimedia data.

Figure 4:
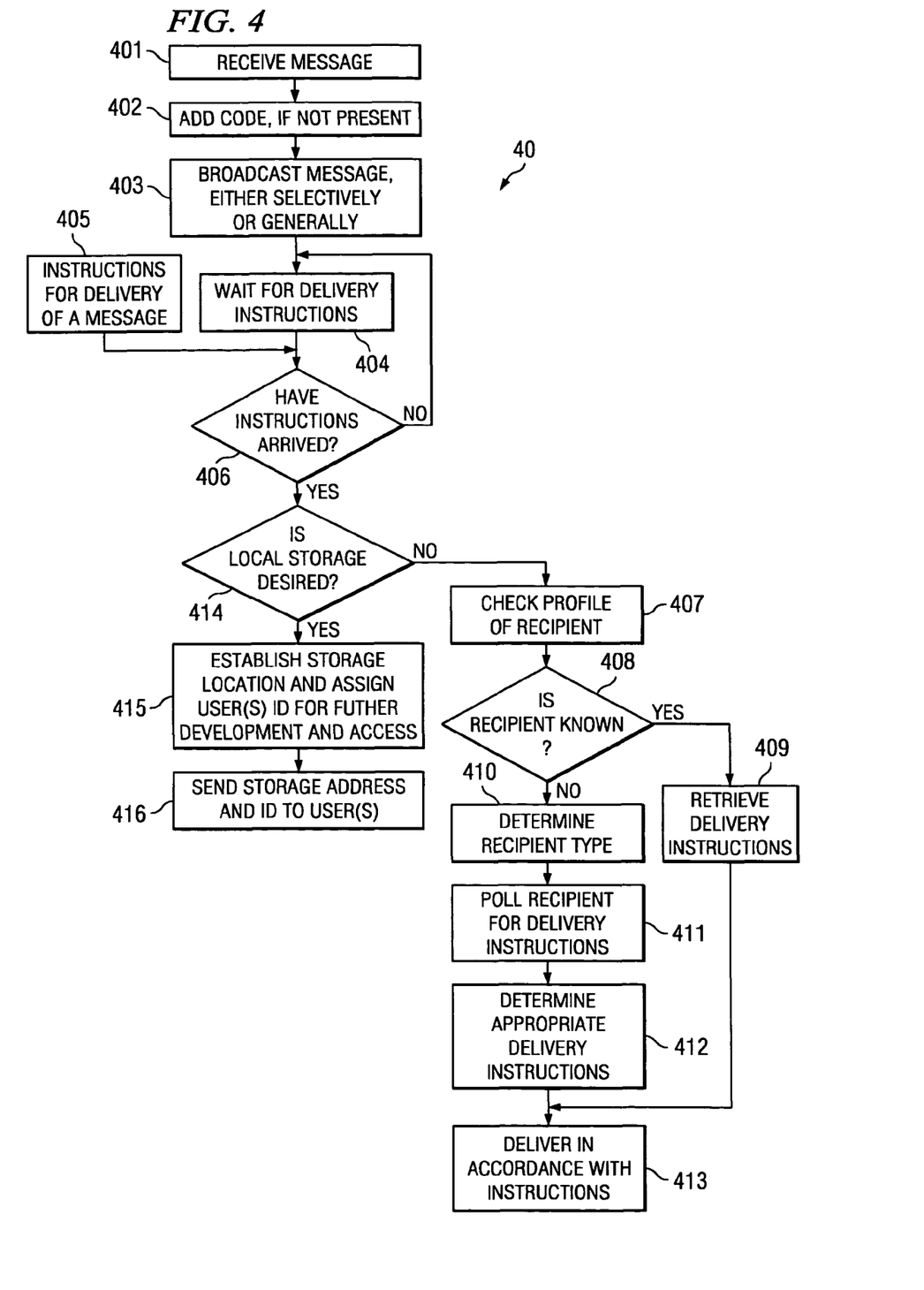
FIG. 4 shows a flow chart of operation according to one embodiment.

FIG. 4 shows flow chart 40 setting forth operation according to one embodiment of the present invention. Process 401 receives a message and, if not present, process 402 adds an identifying code thereto. The message is then, via process 403, broadcast generally, or selectively, or just held in storage.

Process 404 holds the message (which, as discussed, can have many sub-parts or files) until instructions arrive, usually from one or more users having access to the network. These messages can take any form, but would typically identify the message and identify one or more recipients of the message. Additional or alternative instructions may be provided, such as to identify how much of the message is to be delivered, to establish a time delay for delivery, etcetera.

Once a delivery instruction arrives, process 405, a determination of action is made at process 406. If the message is to be stored, locations of storage are determined. User IDs. and card message IDs are also set, via process 415 and the user is notified via process 416.

When a message is ready for delivery, process 407 checks the recipients profile, if known, via process 408 and delivers the message in accordance with instructions processes 409 and 413. If no profile is known, then processes 410, 411 and 412 determine the proper delivery process (including how much of the message is to be delivered).

In one embodiment, the receiving user can determine how much and in what form, the message should be delivered. In another embodiment, MRG 130 makes that determination depending on parameters it "knows" about each recipient. The mobile network can detect if the receiving user is a cellular user and perhaps send a stripped down (e.g., lower resolution) version. If the recipient user is utilizing a computer (or a PDA) a more robust (e.g., higher definition) version may be sent. The message might go to the recipient's mailbox and if desired, the recipient might have delivery instructions posted, which might be by sending user only content type.

Note that the sender and receiver can be the same person. Thus, the sender can send this message to himself because he/she is on the move and may not have time or may not have enough bandwidth to download the whole video clip at this time. The message can be redirected or retimed (stored) for later delivery, or both. The user may wish to add on some information, and this added on portion can be stored at MRG 130, or could just be added to message and assembled at the recipient location.

In operation, a community of people can then edit a single message, or a bundle of messages, all working together between the cellular network and the Internet. In addition, a user(s) could ask for storage space via process 414, 415, 416 (either at the MRG (database 140) or at a third site (database 140-1)) and "rent" that space to store content thereof. This space could be rented so that messages can be edited, or so that messages can be forwarded, or even saved for later use by the user.

Also, this system allows for the selective display at certain locations, such as a supermarket, via process 403, of information directed to people likely to be using that location. By making content delivery interactive, e.g., giving a discount to a user and enabling the user to message with respect to the content, advertisers messages can be more effectively distributed. For example if a terminal at the supermarket is advertising certain products and also testing responses from consumers, or testing consumers for something (such as sickness) the advertiser can get the results from a particular subscriber and send the results together with further advertisement to the consumer's own device based on his/her particular receiving capability.

From the above, it should be readily apparent to one of ordinary skill in the art that embodiments of the present invention provide for multimedia content delivery to multiple recipients, such as for advertisement referral, and/or implementing multi-modality, such as allowing a user to deliver content to different platforms of that same user (e.g., mobile handset, office/home broadband network device, etcetera). Embodiments of the present invention may not only enhance MMS/SMS features to treat messages differently, buy may also provide extended and/or complicated computational operations, such as store, forward, transcode, etcetera. MRGs of embodiments of the invention link wireless and wire-line networks, and accommodate a user's specific network setup as well as linking the user with his/her friends or groups of friends, such as for referral of content. Accordingly, MRGs of preferred embodiments are applicable to a variety of networks and services and deal with various media modalities and presentation formats. Operation of such MRGs provides "pairing" or "matching" of referral relationships for "directing" or "forwarding" to the different modalities of processing/presentation/display capabilities.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communication of content, said method comprising:

storing content within a database, said database being coupled to a server;

uniquely identifying said stored content;

after said storing and identifying, receiving, at said server, from a first user device of a plurality of user devices an abbreviated message including identification of certain content of said stored content for sending at least a portion of said stored content to a second user device of said plurality of user devices as a data rich message, wherein said data rich message is selected from the group consisting of: videodata and audio data;

compiling, at said server, said data rich message using said identification of said certain content to retrieve appropriate content of said stored content from said database for inclusion in said data rich message;

transmitting said complied data rich message to said second user device; and displaying content to said first user, wherein said displaying said content includes providing information identifying corresponding said stored content, wherein said content is displayed to said first user on a device separate from said user device, wherein said separate devices receives said abbreviated message from said first user device.

2. The method of claim 1, wherein said separate device comprises a device comprises a device selected from the group consisting of:
   a point of sale terminal;
   a kiosk; and
   a display monitor.

3. The method of claim 1, wherein said separate device provides said information identifying corresponding said stored content to said first user device electronically.

4. The method of claim 1, further comprising:
   transmitting, by said first user device, said abbreviated message via a native network of said first user device.

5. The method of claim 4, wherein said native network comprises a cellular telephone network.

6. The method of claim 4, wherein said native network comprises a WLAN.

7. The method of claim 1, wherein said abbreviated message comprises a short message service (SMS) message.

8. The method of claim 1, further comprises:
   prior to said compiling said data rich message, identifying a version of said certain content suitable for use by said second user device.

* * * * *

UNITED STATES PATENT AND TRADEMARK OFFICE
CERTIFICATE OF CORRECTION

PATENT NO. : 8,732,239 B2
APPLICATION NO. : 10/677418
DATED : May 20, 2014
INVENTOR(S) : Zhibin Lei et al.

It is certified that error appears in the above-identified patent and that said Letters Patent is hereby corrected as shown below:

In the Specification:
At column 9, line number 63, delete "1 1-1" and replace with --11-1--.

In the Claims:
At column 12, claim number 1, line number 65, delete "videodata" and replace with --video data--.
At column 13, claim number 1, line number 9, delete "devices" and replace with --device--.
At column 13, claim number 2, line number 13, delete "comprises a device comprises a device" and replace with --comprises a device--.

Signed and Sealed this
Seventh Day of October, 2014

Michelle K. Lee
*Deputy Director of the United States Patent and Trademark Office*